United States Patent
Parto et al.

(10) Patent No.: US 7,482,795 B2
(45) Date of Patent: Jan. 27, 2009

(54) PRE-BIAS PROTECTION CIRCUIT FOR CONVERTER

(75) Inventors: Parviz Parto, Laguna Niguel, CA (US); Yang Chen, Long Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/782,774

(22) Filed: Jul. 25, 2007

(65) Prior Publication Data

US 2008/0049465 A1 Feb. 28, 2008

Related U.S. Application Data

(60) Provisional application No. 60/820,551, filed on Jul. 27, 2006.

(51) Int. Cl.
*G05F 1/575* (2006.01)
*G05F 1/40* (2006.01)

(52) U.S. Cl. .................. 323/284; 323/224; 323/901

(58) Field of Classification Search ............ 363/49; 323/224, 282, 284, 285, 351, 901
See application file for complete search history.

(56) References Cited

U.S. PATENT DOCUMENTS 7,002,328 B2 * 2/2006 Kernahan et al. ........... 323/283
7,045,992 B1 * 5/2006 Silva et al. .................. 323/222

* cited by examiner

*Primary Examiner*—Gary L Laxton
(74) *Attorney, Agent, or Firm*—Ostrolenk, Faber, Gerb & Soffen, LLP (57) ABSTRACT

A pre-bias protection circuit for a converter circuit including a switching stage having high-and low-side switches connected in series at a switching node and an output stage connected to the switching node having a capacitor having a pre-existing pre-bias voltage at startup of the converter circuit, the pre-bias protection circuit controlling discharge of the pre-bias voltage when the low-side switch is turned ON during a start up of the converter circuit. The pre-bias protection circuit includes a first circuit for providing a first output; a second circuit providing a second output; and a comparator circuit for comparing the first output and the second output and producing a third output comprising a pulse width modulated signal for driving the low side switch such that the pulse width modulated signal starts with a small duty cycle and thereafter increases to a larger duty cycle, thereby to prevent the pre-bias voltage from discharging during startup.

19 Claims, 14 Drawing Sheets

PRE-BIAS PROTECTION CIRCUIT FOR CONVERTER

CROSS-REFERENCE TO RELATED APPLICATION

This application is based on and claims priority to U.S. Provisional Patent Application Ser. No. 60/820,551, filed on Jul. 27, 2006 and entitled PREBIAS PROTECTION CIRCUIT FOR CONVERTER, the entire contents of which are hereby incorporated by reference herein.

BACKGROUND OF THE INVENTION

The present invention relates to converter circuits and more particularly to pre-bias protection circuits for the converter circuits.

Figure 1:
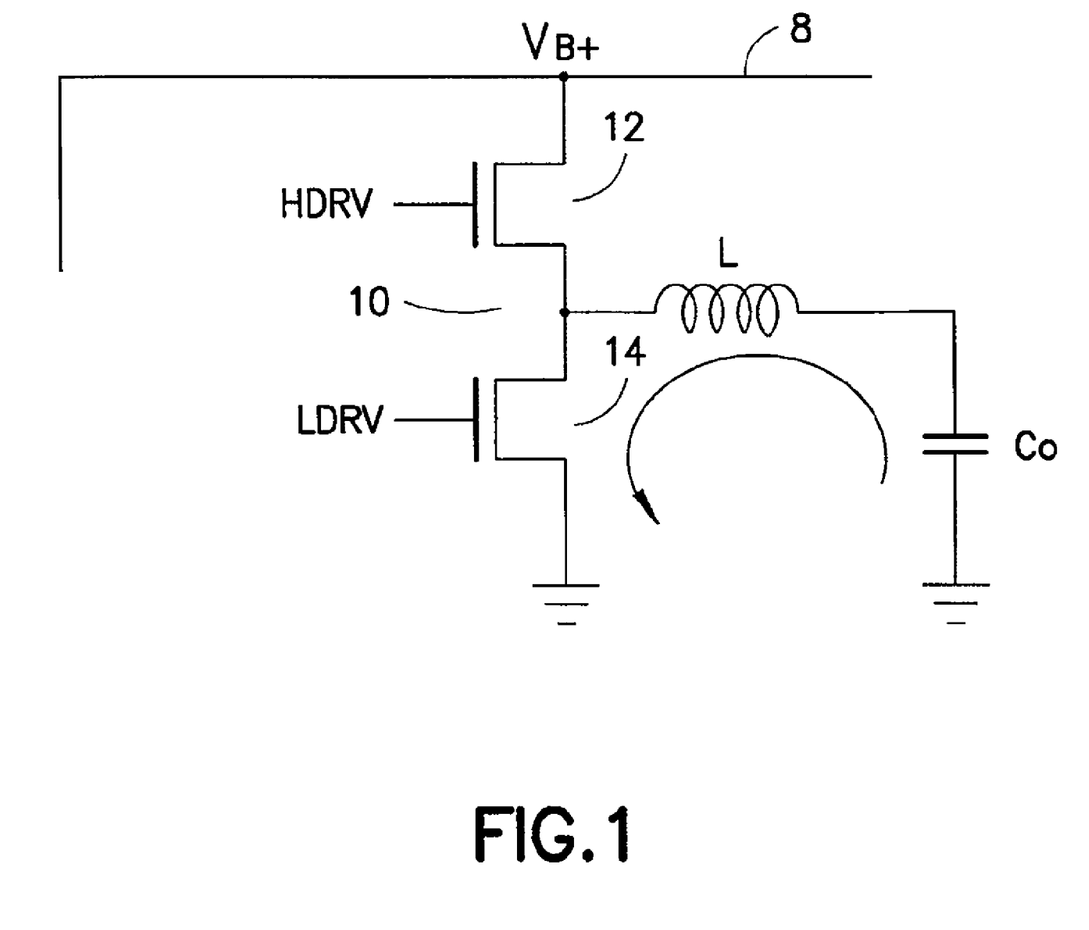
FIG. 1 is a diagram of a converter circuit having a transistor output switching stage and a capacitor having the pre-bias voltage.

Voltage, pre-existing at an output stage of a converter, for example, a converter circuit 8 having a transistor stage 10 illustrated in FIG. 1, prior to start up is referred to as pre-bias voltage. When the converter circuit 8 starts up, high- and low-side switches 12 and 14 of the transistor stage 10 will be driven by high- and low-side switch control signals Hdrv and Ldrv from respective high- and low-side gate drivers. When the low-side switch control signal Ldrv is applied to the low-side switch 14 during startup, the output capacitor $C_O$ having the pre-bias voltage may discharge through the output inductor L and the low-side switch 14. Discharging the pre-bias voltage may result in glitches and cause problems in systems, e.g., multi-processor systems.

In order not to discharge the pre-bias voltage, specific attention needs to be taken during a start up of the converter circuit 8. Therefore, because discharge of the pre-bias voltage is undesirable, discharging of the output capacitor $C_O$ of the converter circuit 8 should be prevented and reversal of an inductor current must not be allowed.

SUMMARY OF THE INVENTION

It is an object of the present invention to prevent discharge of the output voltage pre-bias during converter startup.

According to the invention, this is achieved by control of the duty cycle of the low-side switch control signal Ldrv during start up, so that the low-side switch control signal Ldrv delivers a starting small duty cycle to the low-side transistor during startup while the high-side transistor operates at a normal duty cycle.

A pre-bias protection circuit is provided for a converter circuit including a switching stage having high- and low-side switches connected in series at a switching node and an output stage also connected to the switching node including a capacitor having a pre-existing pre-bias voltage at startup, the pre-bias protection circuit controlling discharge of the pre-existing voltage when the low-side switch is turned ON during a start up of the converter circuit. The pre-bias protection circuit including first circuit for providing a first output; a second circuit for providing a second output; and a comparator circuit for comparing the first output and the second output and producing a third output comprising a pulse width modulated signal for driving the low side switch such that the pulse width modulated signal starts with a small duty cycle and thereafter increases to a larger duty cycle. The third output signal drives the low side switches at startup with a gradually increasing duty cycle to prevent the pre-bias voltage from discharging.

Other features and advantages of the present invention will become apparent from the following description of the invention that refers to the accompanying drawings.

DETAILED DESCRIPTION OF EMBODIMENTS OF THE INVENTION

Figure 2:
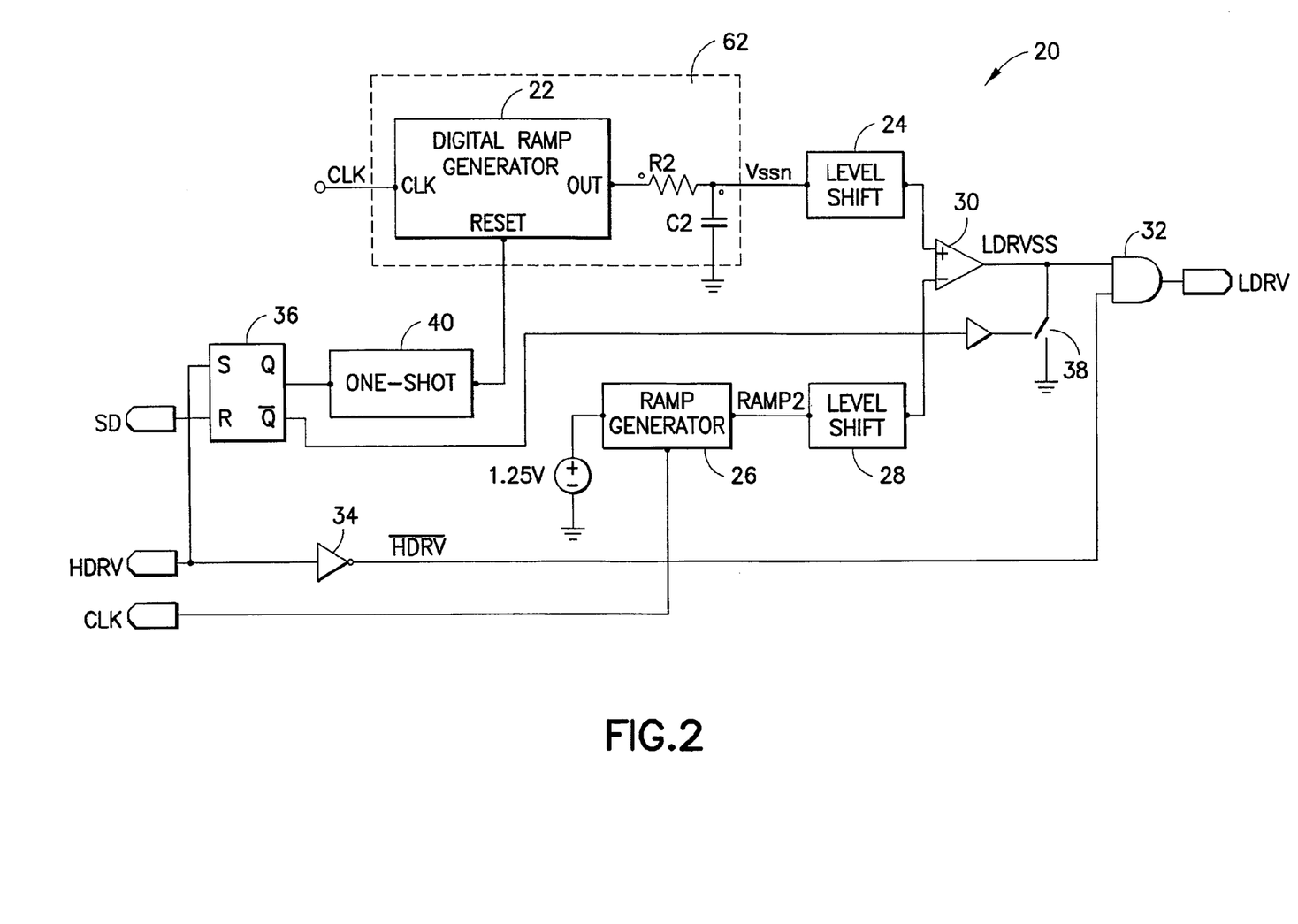
FIG. 2 is a diagram of a circuit of an embodiment of the present invention that receives the high-side control signal and provides the low-side control signal having an increasing ON duty cycle at startup to prevent pre-bias voltage discharge.

The present invention provides a way of preventing discharge of the pre-bias voltage in the converter circuits. This is achieved by controlling the duty cycle on-time of the low-side transistor. FIG. 2 illustrates a circuit 20 that receives the high-side switch control signal Hdrv and processes it into the low-side switch control signal Ldrv. The circuit 20 includes a digital ramp generator circuit 22 with a corresponding level shifter circuit 24, an analog ramp generator circuit 26 also with a corresponding level shifter circuit 28. Both ramp generator circuits 22 and 26 receive a clock signal Clk. An output of the digital ramp generator circuit 22 is filtered using a Low Pass Filter including a register R2 and a capacitor C2. An output of the level shifter circuits 24 and 28 is compared by a comparator circuit 30. Further, an AND circuit 32 is used to AND a signal $Ldrv_{SS}$ of the comparator circuit 30 with an inverse of the high-side switch control signal Hdrv, inverted in the inverter circuit 34.

The circuit 20 also includes a flip-flop circuit 36 responsive to a shut down signal SD used to shut down the circuit 20 by connecting a switch 38 to the ground. The flip-flop circuit 36 also provides, when the shut down signal SD is OFF, responsive to the high-side switch control signal Hdrv, a signal to a one-shot circuit 40 to reset the digital ramp generator circuit 22.

Figure 3:
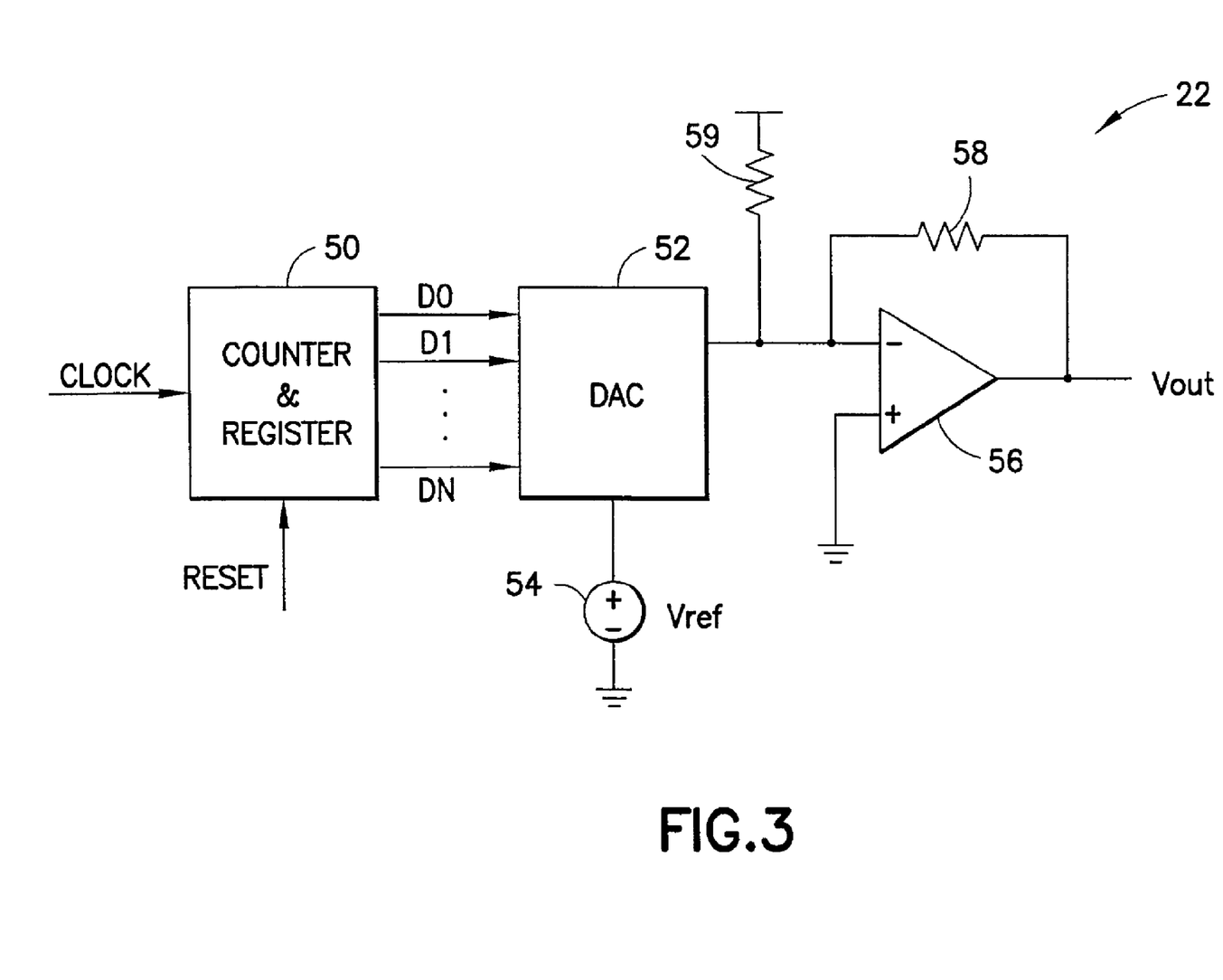
FIG. 3 is a diagram of a digital ramp generator circuit of an embodiment the present invention.

FIG. 3 illustrates the digital ramp generator circuit 22 that includes a counter and register circuit 50 counting the clock signal Clk and being reset by the reset signal from the one-shot circuit 40 (FIG. 2) for resetting the count. The circuit 22 further includes a digital to analog converter (DAC) circuit 52 having a voltage reference 54 and outputting an analog converted value to an amplifier circuit 56 having a resistor 58 connected in parallel to its negative input and output terminals. One terminal of another resistor 59 is connected to an output terminal of the DAC circuit 52 and the negative input terminal of the amplifier circuit 56. A positive input terminal of the amplifier circuit 56 is connected to ground.

Figure 4:
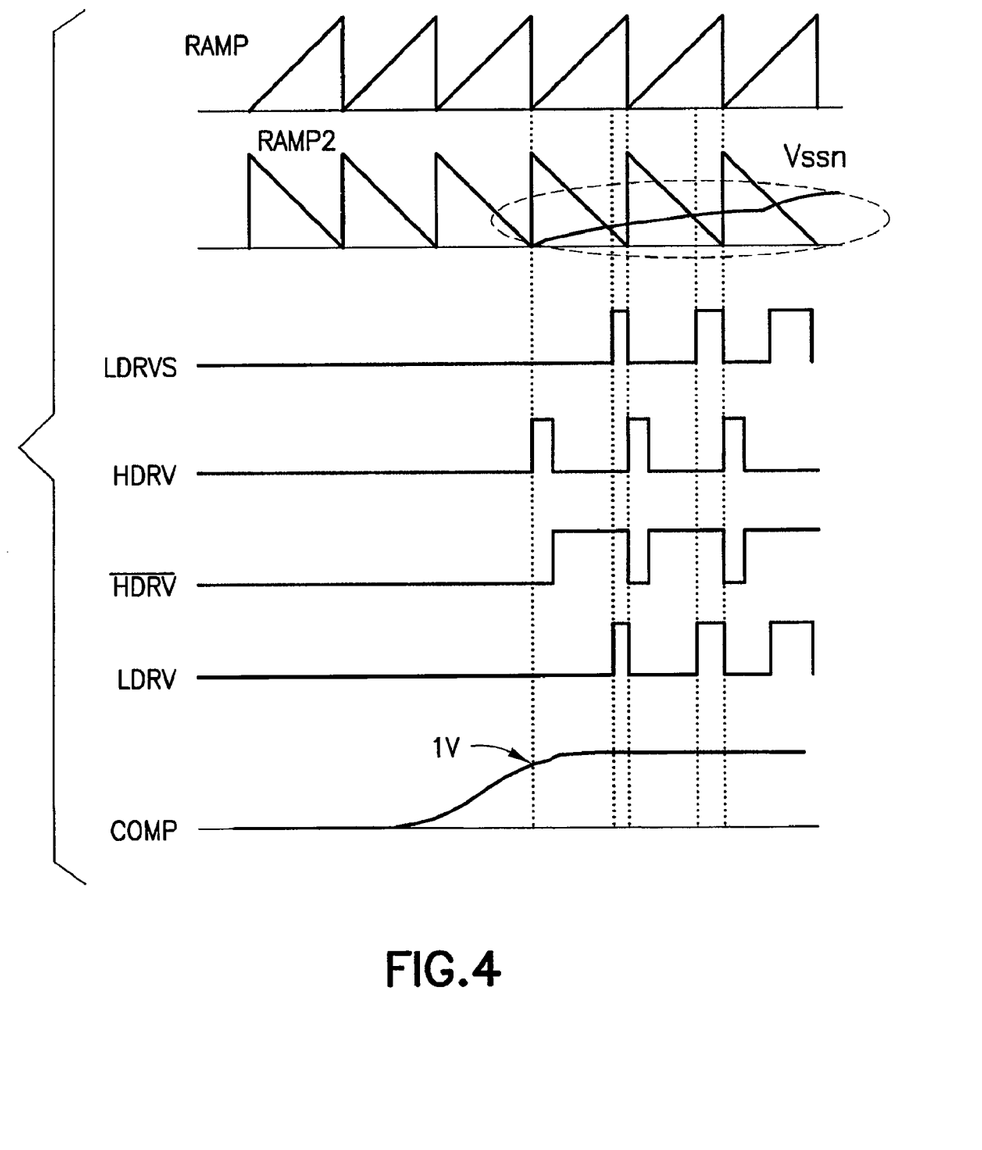
FIG. 4 is a graph of various signals produced by the circuit of FIG. 2 using the high-side control and clock signals as input.

FIG. 4 illustrates graphs of the signals produced by the circuit 20 using the high-side switch control and clock signals Hdrv and Clk. A Ramp 2 signal is produced by the analog ramp generator circuit 26. At startup, as the high-side switch control signal Hdrv turns ON, voltage $V_{SSN}$, produced as the integrated output of the digital ramp generator circuits 22, starts to rise. The slope of the voltage $V_{SSN}$ is fixed as is the pre-bias startup time. A pulse width modulated signal $Ldrv_{SS}$ is generated by the comparator 30 to be ON when the voltage $V_{SSN}$ crosses the OFF Ramp 2 signal and OFF when the voltage $V_{SSN}$ crosses the ON Ramp 2 signal. The low-side switch control signal Ldrv is generated by the AND operation of the AND circuit 32 which assures that the low-side switch control signal Ldrv is ON only when the inverse of the high-side switch control signal Hdrv is ON or, in other words, when the high-side switch control signal Hdrv is OFF.

Because the slope of the voltage $V_{SSN}$ is fixed, the signal $Ldrv_{SS}$ and thus, the low-side switch control signal Ldrv provide control of a duty cycle of the low-side transistor 14 so that at startup the low-side switch control signal Ldrv delivers duty cycles to the low-side transistor that start from and increase over time while the high-side transistor operates at a normal duty cycle.

The operation of the switching stage 10 starts when voltage, e.g., at Comp pin of an IC controlling the stage is detected to be over some predefined offset voltage, for example 1V. Once the offset voltage is reached, the first HDrv signal is generated and Vssn starts to ramp in the meantime.

Figure 5A:
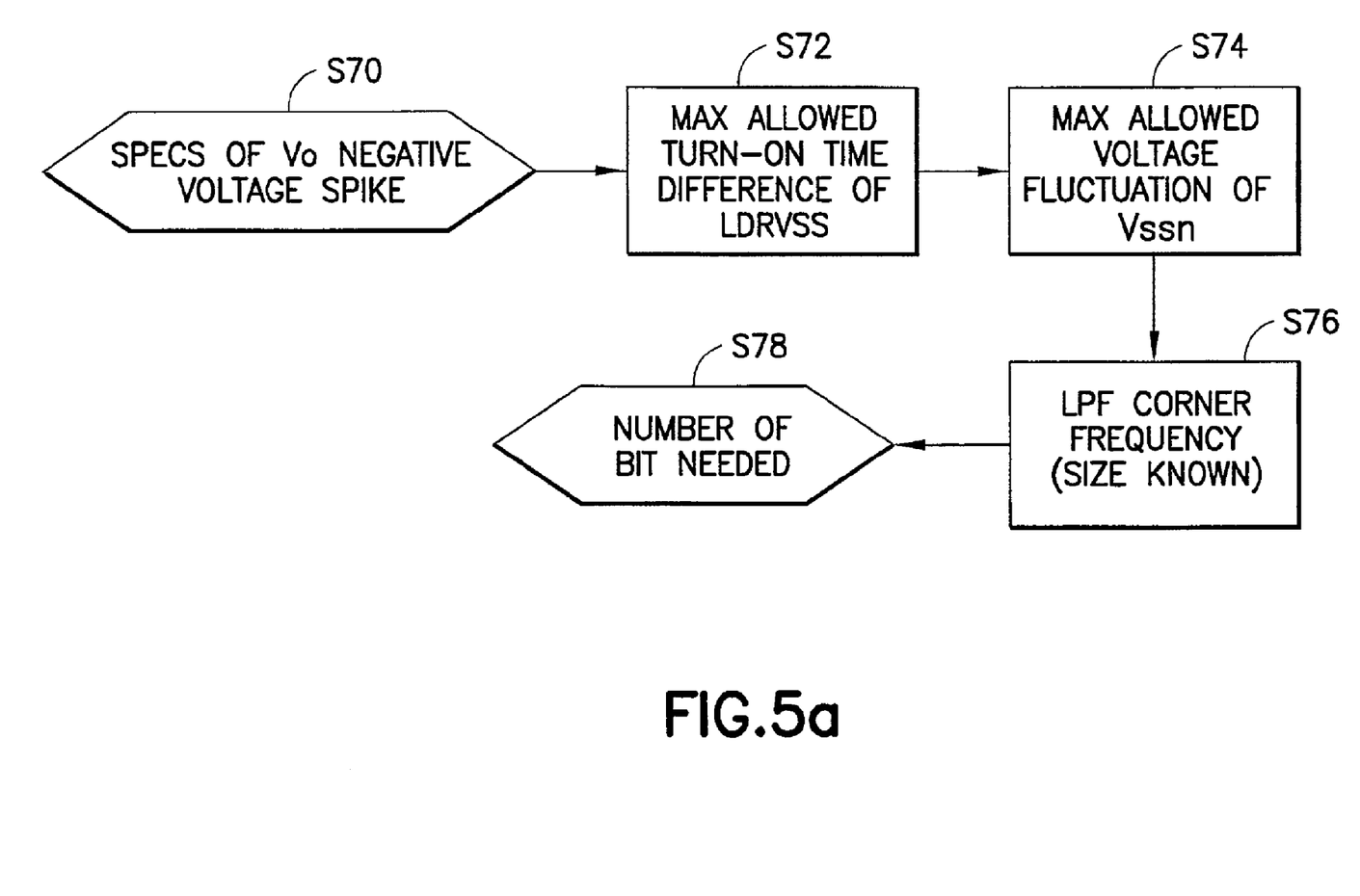
FIG. 5a is a flow diagram of a digital pre-bias ramp generator.

FIG. 5a illustrates how the digital ramp generator specification and the characteristics of the Low Pass Filters (R2, C2) are designed. First, specifications of a negative voltage $V_0$ spike are received in step S70; a maximum allowed turn-ON time difference of the signal $Ldrv_{SS}$ is determined in step S72; a maximum allowed voltage fluctuation of voltage Vssn is determined in step S74; the Low Pass Filter (LPF) corner frequency is determined in step S76; and the number of Bits needed for the digital ramp generator for adequate resolution is calculated in step S78.

Figure 5B:
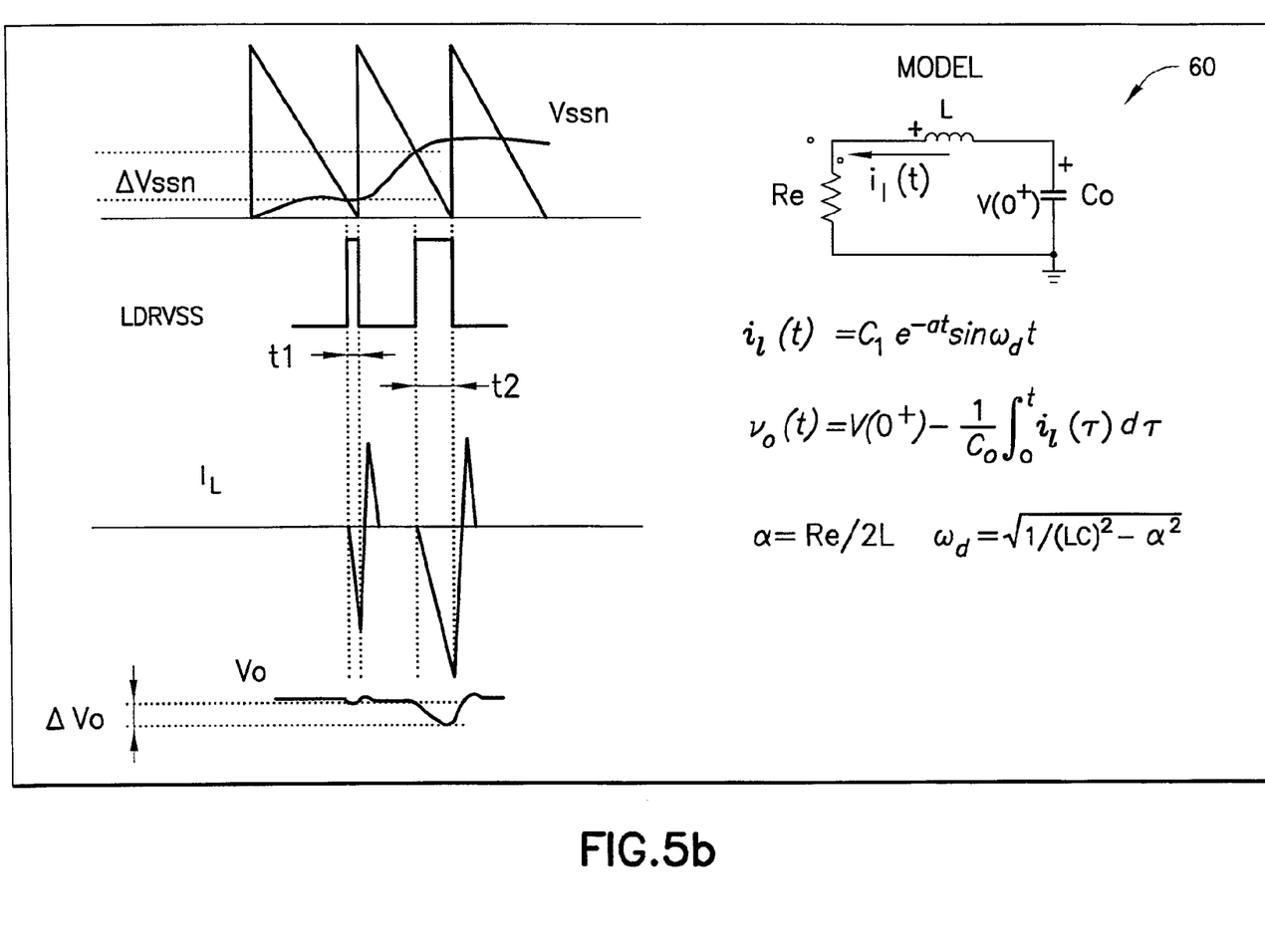
FIG. 5b is a diagram showing a function of fluctuations in the voltage $V_{SSN}$ causing a step change of a signal $Ldrv_{SS}$ turn ON time.

FIG. 5b illustrates fluctuations in the voltage $V_{SSN}$. As shown, fluctuation on voltage $V_{SSN}$ causes step change on the turn-ON time of the signal $Ldrv_{SS}$, thus inducing negative voltage spike in a voltage $V_0(t)$, illustrated in a diagram 60 as the pre-bias voltage $V(0^+)$. At ON time t1, only a small amount of the current $I_L$ is allowed to flow through the transistor 14 (FIG. 2) causing imperceptible change in the voltage $V_0(t)$. At ON time t2, a longer duration than ON time t1, a larger amount of the current $I_L$ is allowed to flow through the transistor 14 causing a larger change $\Delta V(0)$ in the voltage $V_0(t)$. The current flow during the ON-time of the signal $Ldrv_{SS}$ is calculated as $$i_l(t) = C_1 e^{-\alpha t}\sin\omega_d t$$

$$v_o(t) = V(0^+) - \frac{1}{C_o}\int_0^t i_l(\tau)d\tau$$

where $\alpha = Re/2L$ and $\omega_d = \sqrt{1/(LC)^2 - \alpha^2}$

Figure 5C:
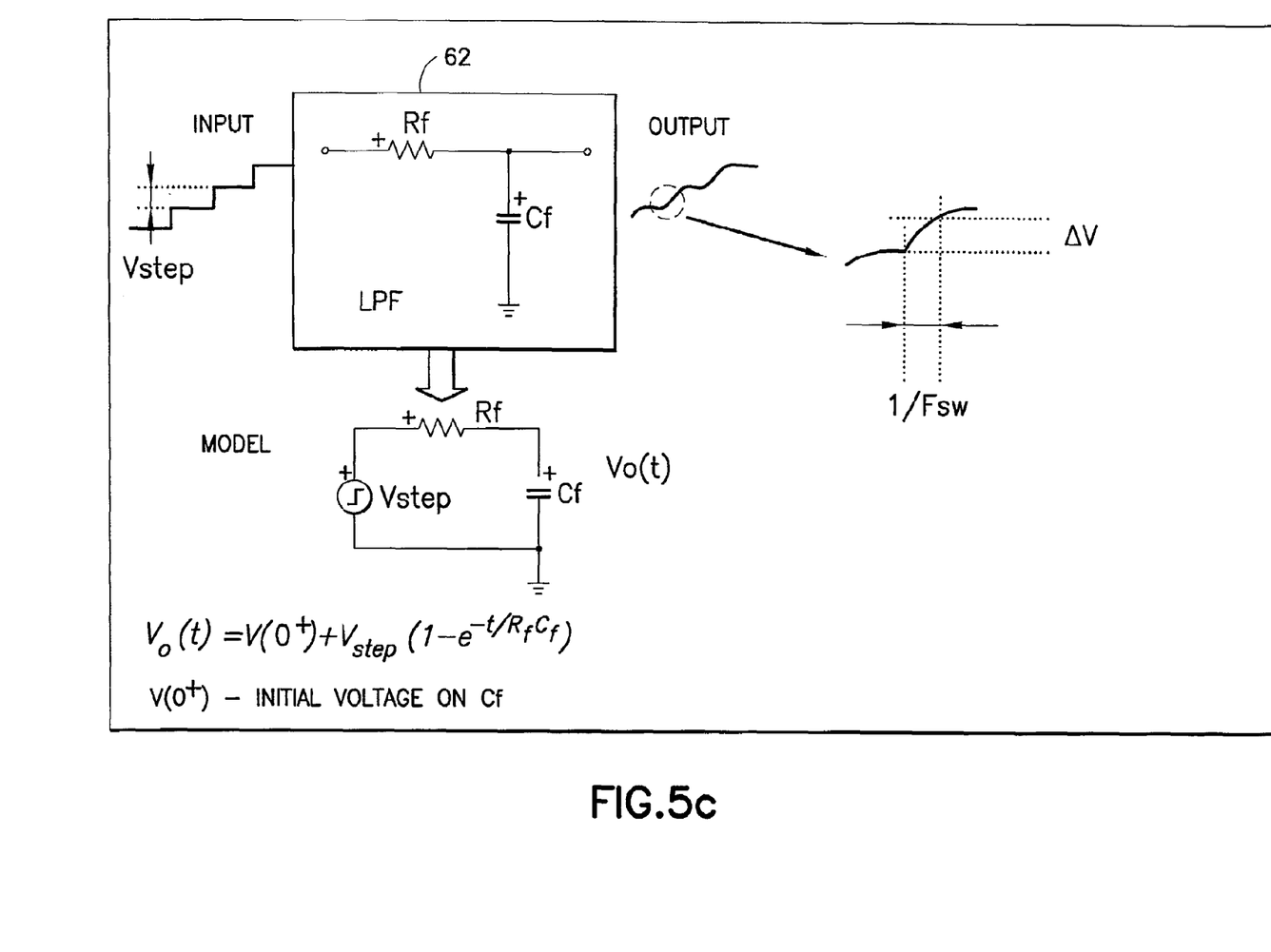
FIG. 5c is a diagram of a Low Pass Filter of the digital ramp generator and a graph of its output.

FIG. 5c illustrates an output of the LPF 62. Input to the LPF 62 is provided by the digital ramp generator circuit 22 (FIG. 2) as voltage steps $V_{step}$. A lower corner frequency of the LPF provides smaller voltage increase within $1/F_{SW}$. A smaller $V_{step}$ provides voltage increase within the $1/F_{SW}$. Thus, the voltage $V_0(t)$ may be calculated as $V_o(t) = V(0^+) + V_{step}(1 - e^{-t/R^fC_f})$, where $V(0^+)$ is the initial voltage on the capacitor $C_f$.

Figure 6A:
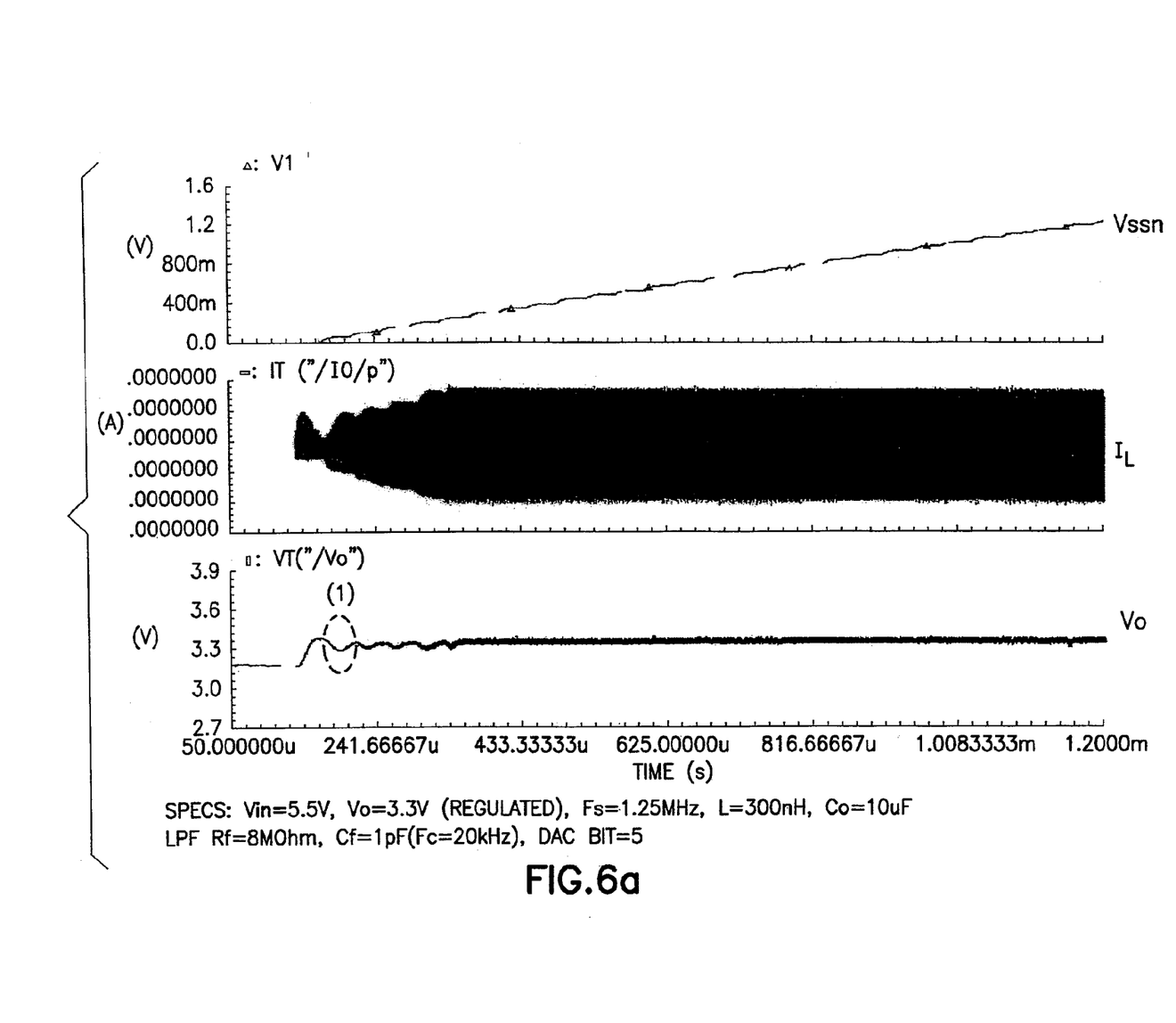
FIGS. 6a-6b are graphs of simulation results of a pre-bias control provided by the embodiment of the present invention in FIG. 2.
Figure 6B:
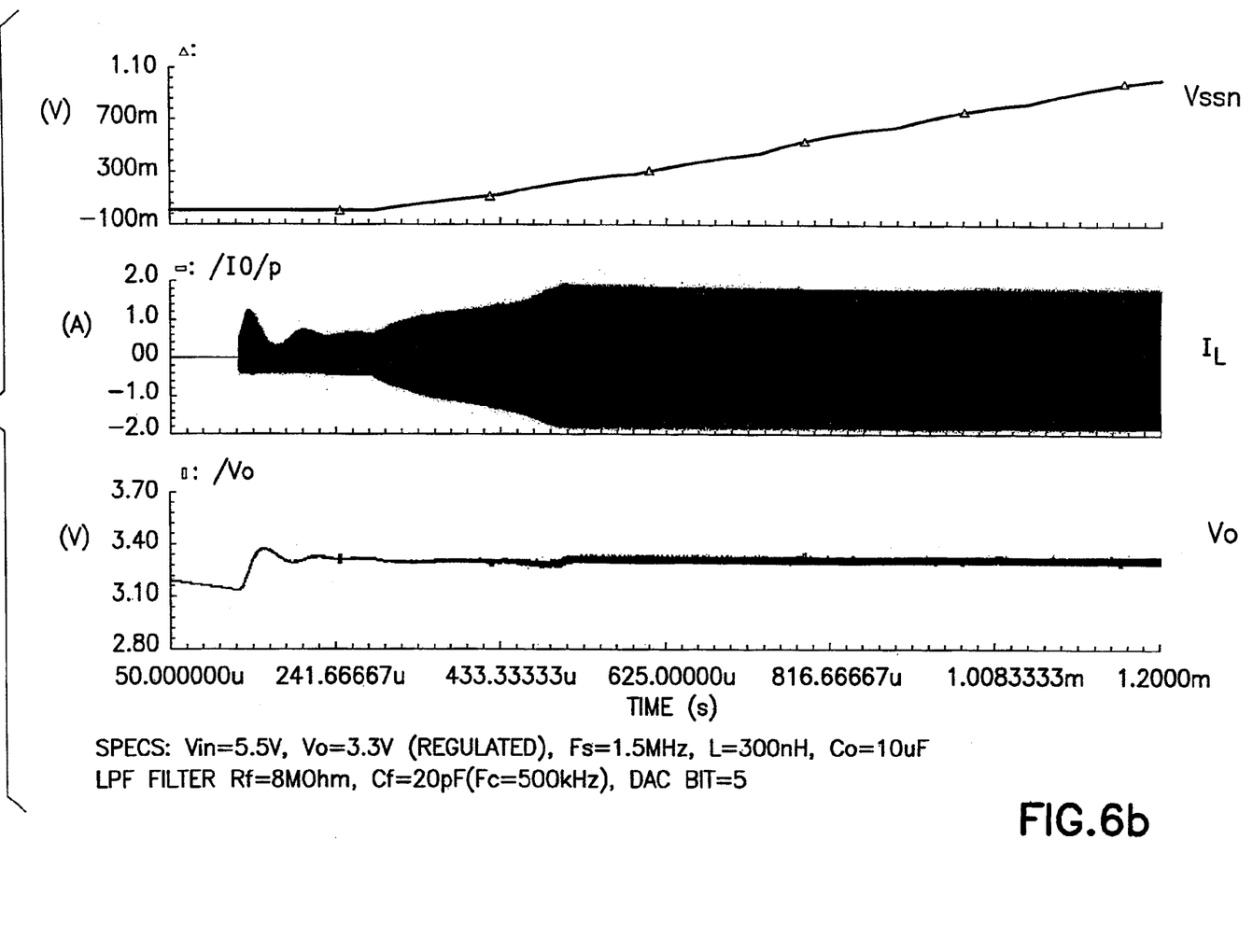

FIGS. 6a and 6b illustrate simulation results of the pre-bias control provided by the invention of the present application. In FIG. 6a voltage $V_{IN}$=5.5V, $V_0$=3.3V, $F_{SW}$=1.25MHz, L=300 nH, Co=10uF, LPF($R_f$=8MOhm, $C_f$=1pF (Fc=20kHz)), DACbit=5. In FIG. 6b the following values were modified: $F_{SW}$=1.5MHz, $C_f$=20pF (Fc=500Hz), DACbit=3.

Figure 7:
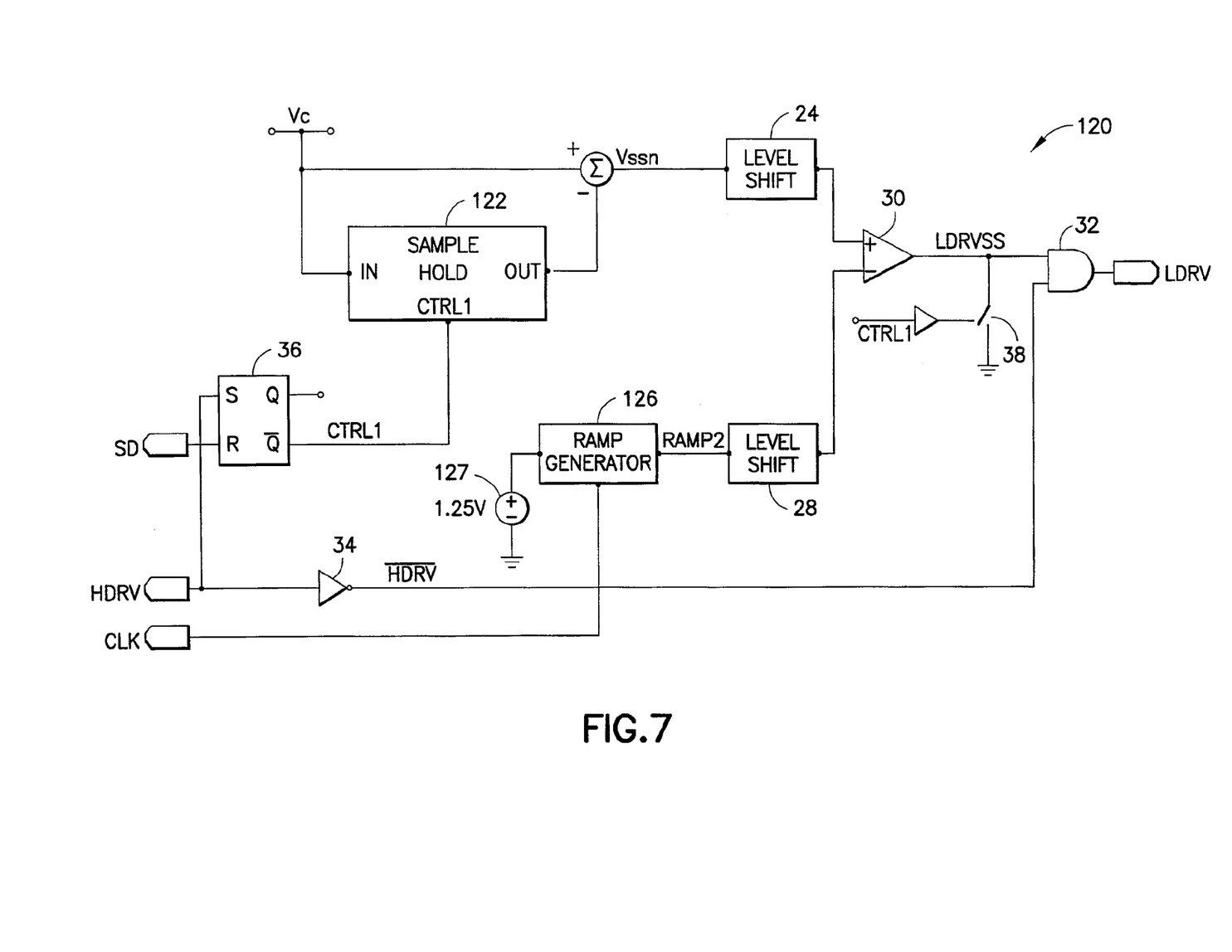
FIG. 7 is a diagram of a circuit of another embodiment of the present invention that provides the low-side control signal having an increasing ON duty cycle at startup to prevent pre-bias voltage discharge.

Another embodiment of the present invention, illustrated in FIG. 7, provides a way of preventing discharge of the pre-bias voltage in the converter circuits without the use of ramp generator circuits. While circuits 20 (FIG. 2) and 120 illustrate two different embodiments of Pre-Bias protection circuits, where circuit 20 uses digital circuits to generate a Vssn ramp and circuit 120 uses analog circuits to generate the Vssn ramp, the ramp generation circuits for Vssn are not limited to theses two approaches. Any other ramp generation circuits may be suitable for this purpose.

FIG. 7 illustrates a circuit 120 that similar to the circuit 20 of FIG. 2 receives the high-side switch control signal Hdrv and processes it into the low-side switch control signal Ldrv. The circuit 120 includes the level shifter circuits 24 and 28, the output of the level shifter circuits 24 and 28 is compared by the comparator circuit 30, and the AND circuit 32 is used to AND the signal $Ldrv_{SS}$ of the comparator circuit 30 with an inverse of the high-side switch control signal Hdrv, inverted in the inverter circuit 34.

The circuit 120 also includes the flip-flop circuit 36 responsive to the shut down signal SD used to shut down the circuit 120 by connecting the switch 38 to the ground. The flip-flop circuit 36 also provides, when the shut down signal SD is OFF, responsive to the high-side switch control signal Hdrv, a signal to the one-shot circuit 40.

In the circuit 120, a digital ramp generator circuit is replaced with a sample and hold circuit 122 that receives an input voltage signal Vc. An output signal produced by the sample and hold circuit 122 is added to the signal Vc to produce the input voltage $V_{SSN}$ supplied to the level shifter circuit 24. Further, a ramp generator circuit 126, receives an external clock signal CLK and a signal from an internal source 127 to produce a ramp signal RAMP to the level shifter circuit 28.

Figure 8:
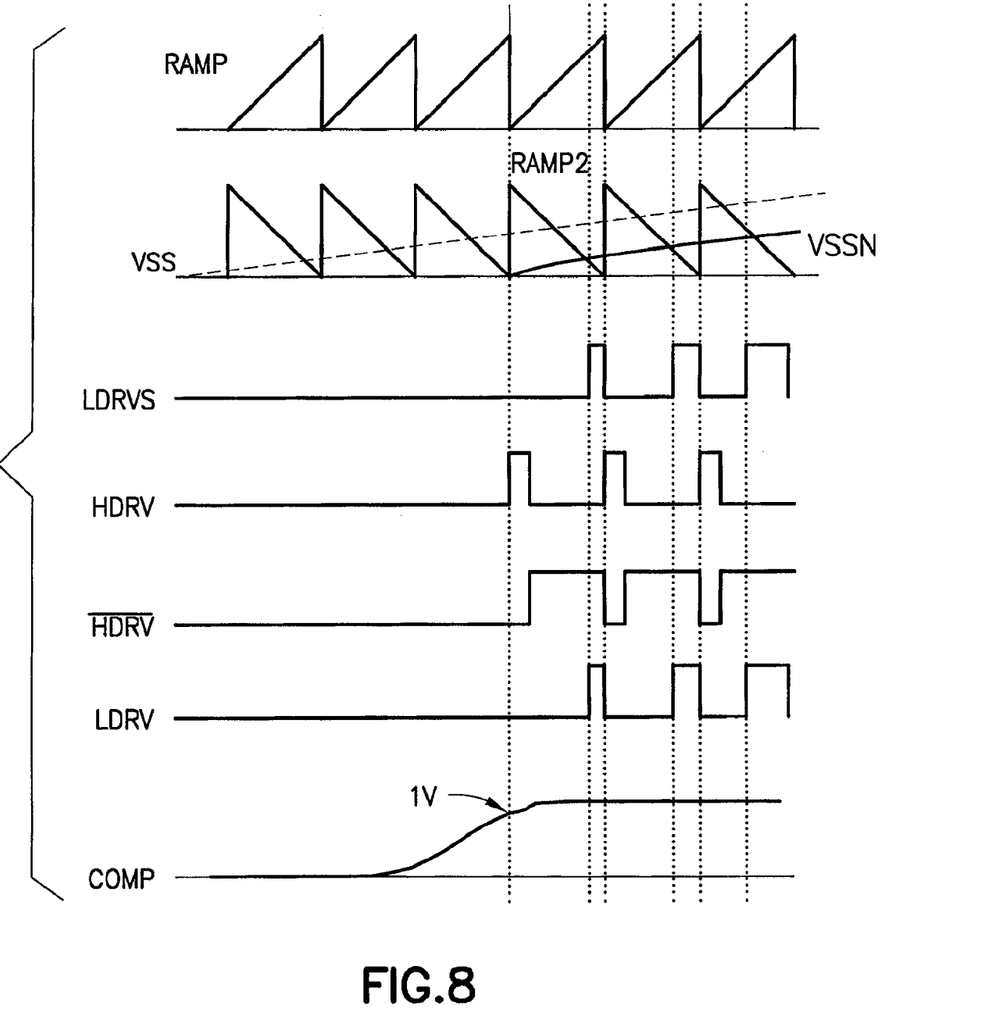
FIG. 8 is a graph of various signals produced by the circuit of FIG. 7.

FIG. 8 illustrates graphs of the signals produced by the circuit 120 using the high-side switch control and ramp signals Hdrv and RAMP. At startup, as the high-side switch control signal Hdrv turns ON, voltage $V_{SSN}$, produced as the integrated output of the sample and hold circuit 122 and the signal SS, starts to rise. The slope of the voltage $V_{SSN}$ is fixed as is the pre-bias startup time. A pulse width modulated signal $Ldrv_{SS}$ is generated by the comparator 30 to be ON when the voltage $V_{SSN}$ crosses the OFF RAMP 2 signal and OFF when the voltage $V_{SSN}$ crosses the ON RAMP 2 signal. The low-side switch control signal Ldrv is ON only when the inverse of the high-side switch control signal Hdrv is ON or, in other words, when the high-side switch control signal Hdrv is OFF.

Because the slope of the voltage $V_{SSN}$ is fixed, the signal $Ldrv_{SS}$ and thus, the low-side switch control signal Ldrv provide control of a duty cycle of the low-side transistor 14 (FIG. 1) so that at startup the low-side switch control signal Ldrv delivers duty cycles to the low-side transistor that start from and increase over time while the high-side transistor operates at a normal duty cycle.

Figure 9A:
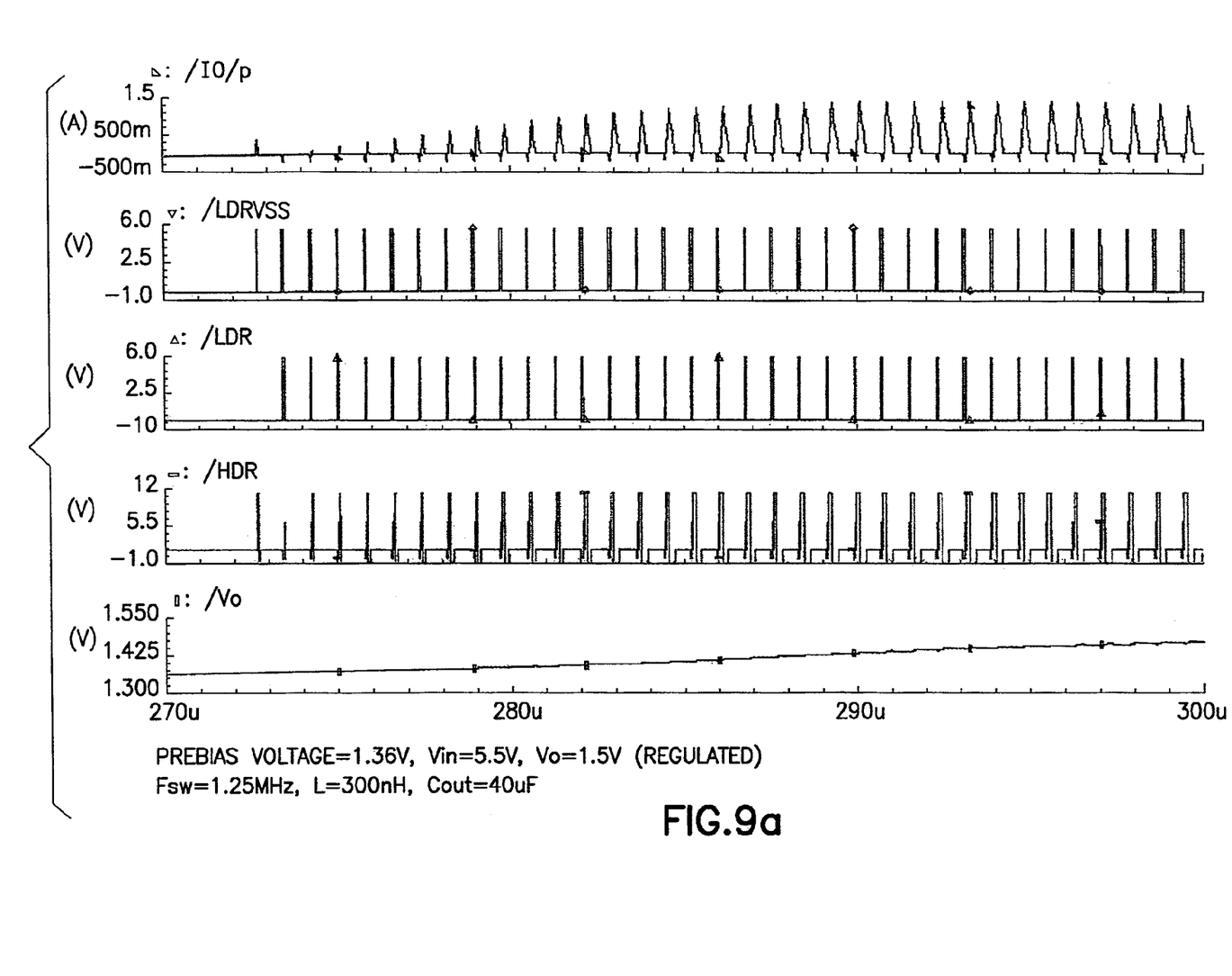
FIGS. 9a-9c are graphs of simulation results of a pre-bias control provided by the embodiment of the present invention in FIG. 7.
Figure 9B:
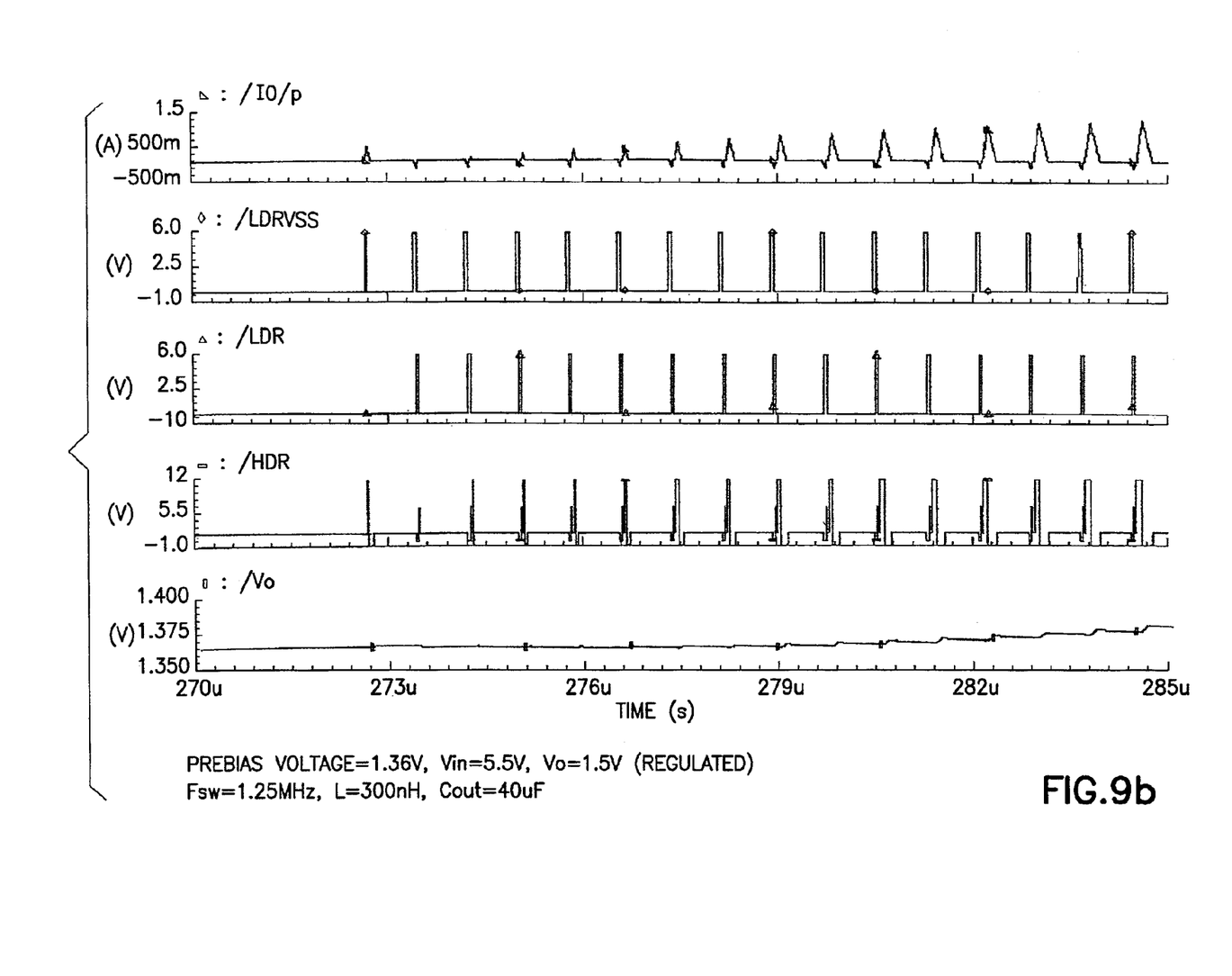
Figure 9C:
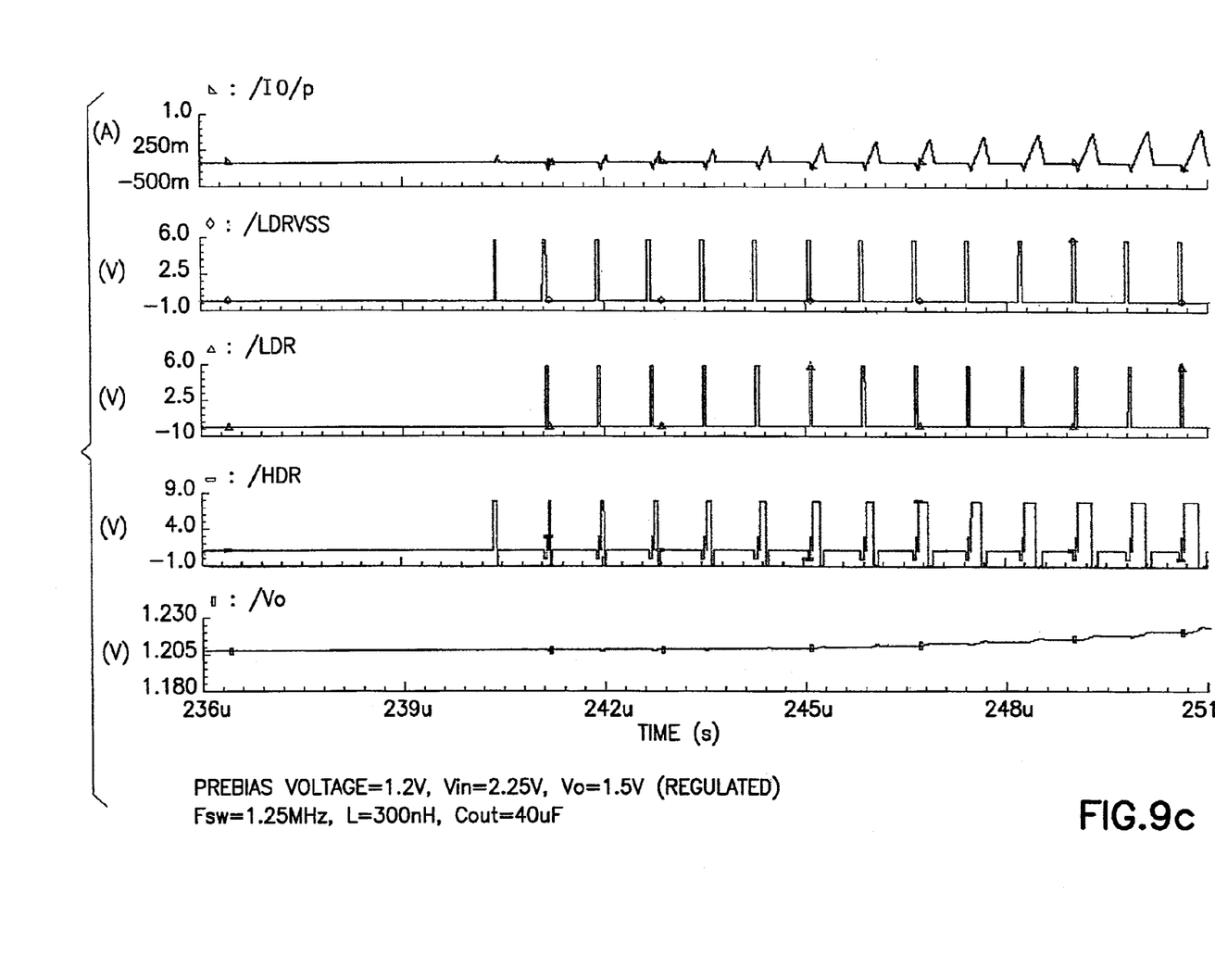

FIGS. 9a-9c illustrate simulation results of the pre-bias control provided by the circuit 120. FIGS. 9a and 9b show graphs taken over different time intervals for the following voltage values: $V_{PREBIAS}$=1.36V, $V_{IN}$=5.5V, $V_O$=1.5V, $F_{SW}$=1.25MHz, L=300nH, Cout=40uF. FIG. 9c shows graphs for the following values were modified $V_{PREBIAS}$=1.2V, $V_{IN}$=2.25V, $V_O$=1.5V, $F_{SW}$=1.25MHz, L=300nH, Cout=40uF.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A pre-bias protection circuit for a converter circuit including a switching stage having high- and low-side switches connected in series at a switching node and an output stage connected to the switching node having a capacitor having a pre-existing pre-bias voltage at startup of the converter circuit, the pre-bias protection circuit controlling discharge of the pre-bias voltage when the low-side switch is turned ON during a start up of the converter circuit, the pre-bias protection circuit comprising:
    a first circuit for providing a first output, the first output comprising a first ramp signal, the first circuit receiving a drive signal for the high-side switch and generating said first ramp signal that increases when said drive signal for said high-side switch is received on start-up of the converter circuit;
    a second circuit providing a second output, the second output comprising a second ramp signal that rises faster than said first ramp signal; and
    a first comparator circuit for comparing the first output and the second output and producing a third output comprising a pulse width modulated signal for driving the low side switch such that the pulse width modulated signal starts with a first duty cycle and thereafter increases to a larger duty cycle, thereby to prevent the pre-bias voltage from discharging during startup.

2. The circuit of claim 1, further comprising first and second level shifter circuits to shift levels of the first output and the second output prior to the comparison by the first comparator circuit.

3. The circuit of claim 2, further comprising a logic circuit for performing a logical operation on the third output and a signal related to the gate control signal of the high-side switch to produce a gate control signal of the low-side switch.

4. The circuit of claim 3, wherein the gate control signal of the low-side switch controls duration of a duty cycle ON-time of the low-side switch.

5. The circuit of claim 4, wherein the logic circuit assures that the gate control signal of the low-side switch is ON only when the inverse of the gate control signal of the high-side switch is ON.

6. The circuit of claim 5, further comprising a shutting down circuit for receiving a shut down signal and shutting down the pre-bias protection circuit.

7. The circuit of claim 1, further comprising a resetting circuit for providing a resetting signal to the first circuit when a gate control signal for the high-side switch turns ON.

8. The circuit of claim 7, wherein the resetting circuit comprises:
    a flip-flop circuit for receiving said gate control signal for the high-side switch; and
    a one-shot circuit for resetting the first circuit in response to a signal from the flip-flop circuit.

9. The circuit of claim 6, wherein when the shut down signal is OFF the shutting down circuit is responsive to the gate control signal of the high-side switch to send a signal to reset the digital ramp generator circuit.

10. The circuit of claim 1, wherein the third output is ON when the first output exceeds the second output.

11. The circuit of claim 1, wherein a fixed slope of the first output is used to increase the duty cycle of the pluse width modulated signal for driving the low-side switch over time from the first duty cycle to the larger duty cycle.

12. The circuit of claim 1, wherein the first circuit comprises a digital ramp generator circuit.

13. A pre-bias protection circuit for a converter circuit including a switching stage having high-and low-side switches connected in series at a switching node and an output stage connected to the switching node having a capacitor having a pre-existing pre-bias voltage at startup of the converter circuit, the pre-bias protection circuit controlling discharge of the pre-bias voltage when the low-side switch is turned ON during a start up of the converter circuit, the pre-bias protection circuit comprising:
    a first circuit for proving a first output, the first output comprising a first ramp signal, the first circuit receiving a drive signal for the high-side switch and generating said first ramp signal that increases when said drive signal for said high-side switch is received on start-up of the converter circuit;
    a second circuit providing a second output, the second output comprising a second ramp signal that rises faster than said first ramp signal; and
    a first comparator circuit for comparing the first output and the second output and producing a third output comprising a pulse width modulated signal for driving the low side switch such that the pulse width modulated signal starts with a first duty cycle and thereafter increases to a larger duty cycle, thereby to prevent the pre-bias voltage from discharging during startup,
    wherein the first circuit comprises a digital ramp generator circuit, the digital ramp generator circuit comprises a digital to analog converter circuit and further comprises a low pass filter integrating the output of the digital to analog converter circuit.

14. The circuit of claim 12, wherein the digital ramp generator circuit comprises:
    a counter and register circuit for receiving a clock signal for counting reset signals from a one-shot circuit;
    a digital to analog converter circuit for receiving a voltage reference and a digital output from the counter and register circuit; and
    an amplifier circuit having an input terminal connected to an output terminal of the digital to analog converter circuit for outputting a converted analog value as the first output.

15. The circuit of claim 1, wherein the first circuit comprises a sample and hold circuit.

16. A pre-bias protection circuit for conrtolling discharge of pre-bias voltage pre-existing in a capacitor, included in an output stage of a converter circuit having a switching stage including high- and low-side switches connected in a series at a switching node, when the low-side switch is turned ON during the start up of the converter circuit, the output stage being connected to the switching node, the pre-bias protection circuit comprising:

a counter circuit for generating a counter output by counting clock signals;

a circuit for resetting the counter circuit in response to a drive signal for said high-side switch;

a digital to analog converter circuit for providing an analog value of the counter output;

an amplifier circuit for receiving the analog value of the counter output and generating a first ramp signal that increases when the drive signal for said high-side switch is received during the start-up of the converted circuit;

a fast ramp circuit for generating a second ramp signal that rises faster than said first ramp signal; and a comparator circuit for comparing the first and second ramp signals and producing an output comprising a pulse width modulated signal for driving the low side such that the pulse width modulated signal starts with a first duty cycle and thereafter increases to a larger duty cycle, thereby to prevent the pre-bias voltage pre-existing in the capacitor from discharging during startup.

17. The pre-bias protection circuit of claim 16, further comprising a flip-flop circuit for receiving the drive signal for said high-side switch as a setting signal and in response enabling a one-shot circuit to reset the counter circuit.

18. A pre-bias protection circuit for controlling discharge of pre-bias voltage pre-existing in a capacitor, included in an output stage of a converter circuit having a switching stage including high-and low-side switches connected in series at a switching node, when the low-side switch is turned ON during the start up of the converter circuit, the output stage being connected to the switching node, the pre-bias protection circuit comprising:

a sample and hold circuit for receiving and holding a voltage reference and being controlled by a drive signal for the high-side switch;

a circuit responsive to an output of the sample and hold circuit and the voltage reference for generating a first ramp signal that increases when the drive signal for said high-side switch is received during the start-up of the converter circuit;

a fast ramp circuit for generating a second ramp signal that rises faster than said first ramp signal; and a comparator circuit for comparing the first and second ramp signals and producing an output comprising a pulse width modulated signal for driving the low side switch such that the pulse width modulated signal starts with a first duty cycle and thereafter increases to a larger duty cycle, thereby to prevent the pre-bias voltage pre-existing in the capacitor from discharging during startup.

19. The pre-bias protection circuit of claim 18, further comprising a flip-flop circuit for receiving the drive signal for said high-side switch as a setting signal and in response enabling the sample and hold circuit to sample and hold the reference voltage.

* * * * *